(No Model.)

C. A. RODNEY.
COMPOSITE WASHER.

No. 271,365. Patented Jan. 30, 1883.

WITNESSES:
Wm A. Skinkle
H. W. Elmore

INVENTOR:
Caesar A. Rodney,
By his Attorneys
Baldwin, Hopkins & Peyton

UNITED STATES PATENT OFFICE.

CAESAR A. RODNEY, OF WILMINGTON, DELAWARE.

COMPOSITE WASHER.

SPECIFICATION forming part of Letters Patent No. 271,365, dated January 30, 1883.

Application filed December 27, 1882. (No model.)

*To all whom it may concern:*

Be it known that I, CAESAR A. RODNEY, of Wilmington, in the county of New Castle and State of Delaware, have invented certain new and useful Improvements in Composite Washers, of which the following is a specification.

My invention relates to the class of washers having an elastic ring or body inclosed in a metal casing, and particularly useful as locks for bolt-nuts; and my said invention constitutes an improvement more especially upon the composite washer patented to me December 12, 1882, as No. 269,119.

The object of my present invention is to provide an improved composite washer of the type mentioned, which, when in place upon a bolt and the nut thereof is screwed up, will not only lock said nut from turning, but will itself be locked from turning movements relatively to said bolt.

The subject-matter claimed is particularly pointed out at the close of the specification.

Figure 1:
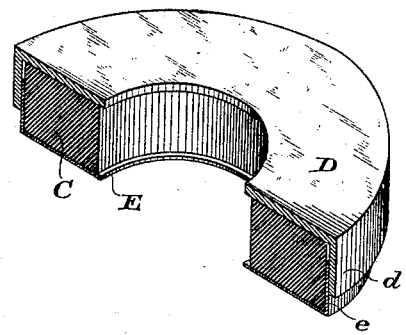
Figure 2:
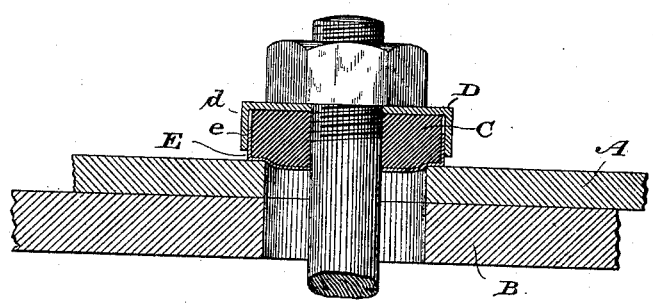
Figure 3:
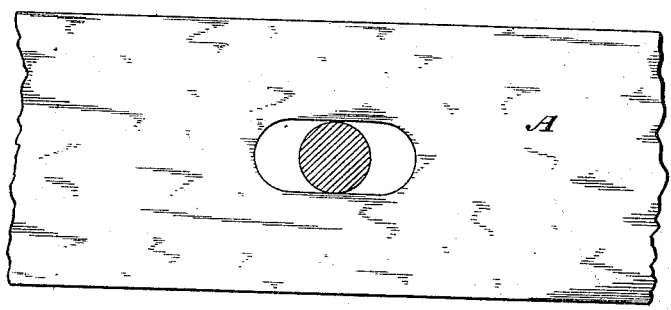

In the accompanying drawings, Figure 1 represents a sectional perspective view taken through the center of one of my improved washers. Fig. 2 is a horizontal section through a railroad-rail and its fish-plates, the bolt connecting the fish-plate and rail being provided with one of my improved washers; and Fig. 3 is a side view of one of said fish-plates.

As is well known, the fish-plates A, which couple the adjacent ends of two rails, B B, are provided with elongated bolt-holes to permit of expansion and contraction without injury to the fish-plate connection upon the passage of trains over the track.

In my aforesaid patent I have shown two stiff metal cups secured together by the friction of interfitting rims with an elastic body or ring between them. These plates being unyielding and fitting the bolt loosely, there is nothing to prevent the washer from turning relatively to the bolt, except the pressure of the nut. I have found it desirable, and to secure the best results necessary, to lock the composite washer from turning upon the bolt by means additional to the friction induced by the pressure of the nut. To this end I substitute for the inner stiff-metal cup of my patent a cup of metal which may bend under the pressure of the nut, so as to be crowded or flow into the oblong hole in the fish-plate through which the bolt passes. This method of locking the washer to the fish-plate so as to prevent it from turning around the bolt is clearly shown in the sectional view, Fig. 2. The elastic body, being incapable of spreading outwardly under the pressure of the nut, is forced inward, so as to bend the inner edges of the flexible-metal cup into the oblong opening, as clearly shown in said Fig. 2. As the compressible or flexible metal cup has a portion of it crowded into the elongated bolt-hole around the bolt, it will be obvious that the washer cannot turn, while its capacity as a nut-lock, due to the pressure it exerts upon the nut when the nut is firmly screwed up, is still retained.

My improved washer therefore consists of an elastic ring or body, C, (preferably vulcanized fiber,) seated in an outer stiff-metal cup, D, against which the nut presses when screwed up, and of an inner flexible-metal cup, E, the inner or bolt edges of which are crowded into the bolt-hole opening by the pressure of the nut and compression of the elastic body. The stiff-metal cup prevents the elastic ring or body from crowding outward under pressure and affords a firm surface, against which the nut may be tightly screwed without injury to the washer. The rim of the flexible-metal cup E may be secured to the outer edge of the flexible ring or body by crimping, pinching, or otherwise, while the outer stiff-metal cup, D, is held by the friction of its rim $d$, which may be made to tightly fit the outer surface of the rim $e$ of said flexible cup E.

Having thus described my invention, I claim herein—

1. An improved composite washer, consisting of a stiff-metal cup and a flexible-metal cup fitted together with an elastic ring or body between them, substantially as described.

2. An improved composite washer, consisting of an elastic ring or body seated within a flexible-metal cup and secured thereto at its edge, and of a second cup fitted to the opposite side of said ring or body and having a rim or flange overlapping the outer edge thereof.

In testimony whereof I have hereunto subscribed my name this 21st day of December, A. D. 1882.

C. A. RODNEY.

Witnesses:
 JOHN C. COLE,
 E. W. GOSEWISET.